(12) United States Patent
Uedono et al.

(10) Patent No.: US 6,919,563 B2
(45) Date of Patent: Jul. 19, 2005

(54) DEFECT EVALUATION APPARATUS UTILIZING POSITRONS

(75) Inventors: Akira Uedono, Tsukuba (JP); Atsushi Ogura, Hachioji (JP)

(73) Assignee: Semiconductor Technology Academic Research Center, Yokohama (JP)

( * ) Notice: Subject to any disclaimer, the term of this patent is extended or adjusted under 35 U.S.C. 154(b) by 0 days.

(21) Appl. No.: 10/649,664

(22) Filed: Aug. 28, 2003

(65) Prior Publication Data

US 2004/0173745 A1 Sep. 9, 2004

(30) Foreign Application Priority Data

Aug. 29, 2002 (JP) ........................................ 2002-251905

(51) Int. Cl.$^7$ ............................................... H01J 37/26
(52) U.S. Cl. ........................ 250/309; 250/306; 250/307
(58) Field of Search ................................. 250/427, 309, 250/308, 306, 307; 356/156

(56) References Cited

U.S. PATENT DOCUMENTS

| | | | | |
|---|---|---|---|---|
| 4,740,694 A | * | 4/1988 | Nishimura et al. | 250/306 |
| 4,864,131 A | * | 9/1989 | Rich et al. | 250/308 |
| 5,063,293 A | * | 11/1991 | Rich et al. | 250/308 |
| 5,107,221 A | * | 4/1992 | N'Guyen et al. | 315/500 |
| 5,159,195 A | * | 10/1992 | Van House | 250/309 |
| 5,200,619 A | * | 4/1993 | Asoka kumar et al. | 250/307 |
| 6,630,666 B2 | * | 10/2003 | Greaves | 250/308 |
| 6,635,871 B2 | * | 10/2003 | Xu et al. | 250/306 |
| 2004/0178353 A1 | * | 9/2004 | Perez et al. | 250/427 |

FOREIGN PATENT DOCUMENTS

| | | |
|---|---|---|
| JP | 03296651 A | 12/1991 |
| JP | 04152546 A | 5/1992 |
| JP | 07270598 A | 10/1995 |
| JP | 2000266699 A | 9/2000 |

OTHER PUBLICATIONS

"Manufacture of a Colinear Geometry–Type Measurement System for Doppler Broadening Profiles of γ–Rays Emitted from the Annihilation of Positrons," RADIOISOTOPES, vol. 47, No. 8, p. 623–627 (1998).

* cited by examiner

Primary Examiner—Nikita Wells
(74) Attorney, Agent, or Firm—Finnegan, Henderson, Farabow, Garrett & Dunner, L.L.P.

(57) ABSTRACT

Disclosed is a defect evaluation apparatus comprising a source section having a source for generating positrons and a moderator for decelerating the positrons, a sample holding section for holding a sample to be measured, a transfer section for transferring the positrons from the source section to the sample holding section, and detection means for detecting γ rays emitted from the sample being measured, characterized in that the apparatus further comprises heating means for heating the moderator in a position where there is a possibility of the source being thermally damaged if there is no protection means mentioned below in the source section, and protection means for protecting the source from the heating means and heated moderator when the moderator is being heated using the heating means.

16 Claims, 11 Drawing Sheets

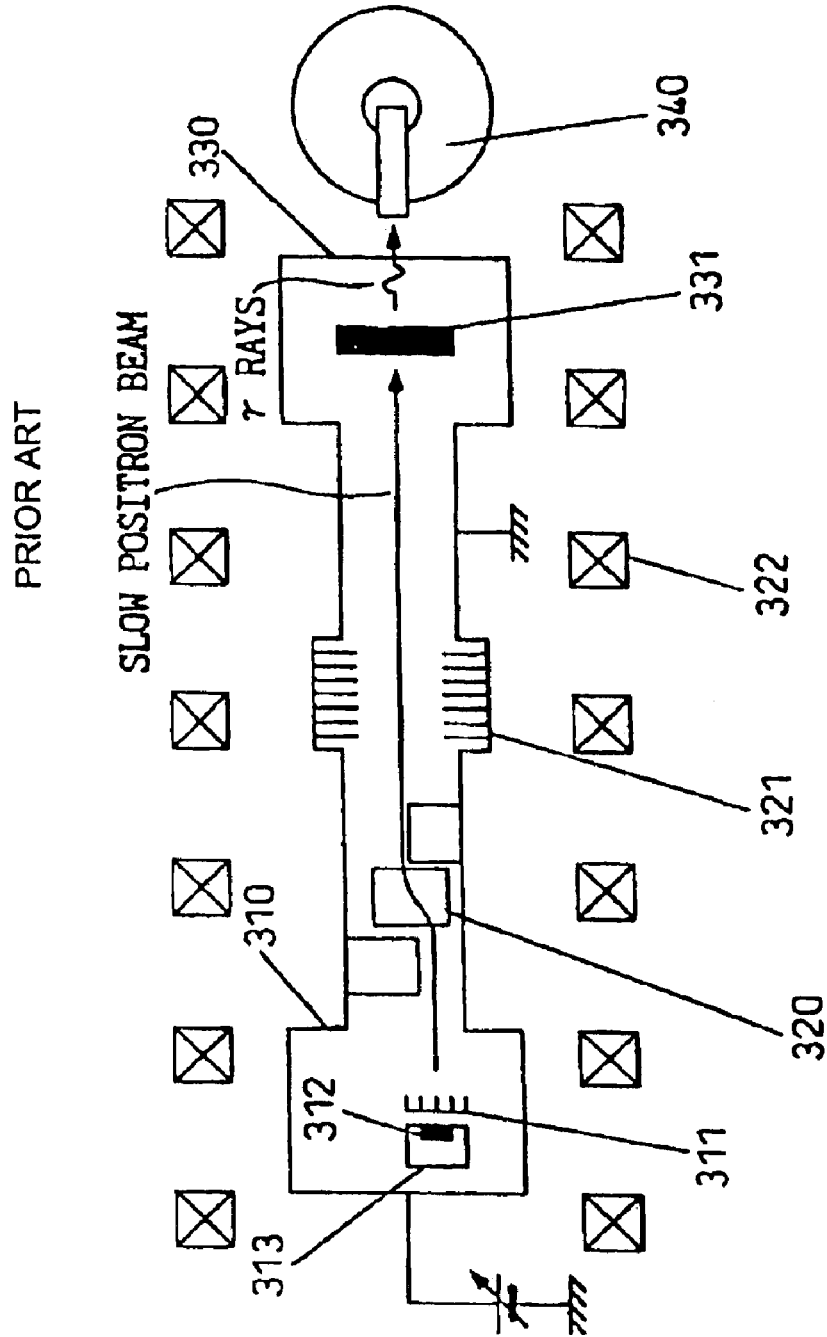

DEFECT EVALUATION APPARATUS UTILIZING POSITRONS

BACKGROUND OF THE INVENTION

1. Field of the Invention

The present invention relates to a defect evaluation apparatus that utilizes positrons. In particular, the present invention relates to a defect evaluation apparatus utilizing positrons that is more compact and has an improved accuracy of measurement as compared to prior art apparatuses.

2. Description of the Related Art

In recent years, as a method for externally detecting and evaluating the electronic structure of materials and the concentration and type of lattice defects existing in materials, a method of utilizing the phenomenon of positron annihilation has attracted attention. When a positron is implanted into a sample, the positron annihilates with an electron to emit, generally, two γ rays. By measuring and analyzing the lifetime of the positrons and the energy distribution and angular distribution of γ rays emitted by positron annihilation, lattice defects and the electronic structure of materials can be studied.

The features of methods utilizing the phenomenon of positron annihilation include high sensitivity to lattice defects, in particular vacancy-type lattice defects, the capability of studying the electronic state of defects or bulk, non-destructiveness, and few experimental constraints such as sample temperature, electrical characteristics, and the like. Therefore, analytical methods utilizing positron annihilation are suitable for evaluating bulk materials and have been used in evaluating a variety of materials such as metals, semiconductors, polymers, and the like. On the other hand, if the energy of positrons can be controlled, the depth to which the positrons are implanted can be optionally selected and positron annihilation can be applied to research on near-surface regions of materials. This technique has been rapidly developed since the 1980s and has attracted attention as a method for evaluating near surface regions of materials.

Although various materials are studied by analyzing defects using a variety of electrical measuring methods other than positron annihilation methods, such as electron spin resonance (ESR), light absorption, and the like, the type of defect cannot be directly identified with any of these methods. In contrast, positron annihilation methods can directly indicate whether the type of defect being observed is a vacancy-type defect. This is the distinct feature of this method.

Positron annihilation methods are used in detecting vacancy-type defects regardless of doped elements, conductivity, or the charge state of the defect (however, positively charged defects are not detected), and are effective in detecting mono-vacancies and multi-vacancies. For example, the approximate positron lifetime in each of perfect crystal, mono-vacancies and multi-vacancies of a variety of semiconductors such as Ge, Si, GaAs, InP, InSb, and the like are substantially proportional to volume per atom (inversely proportional to the valence electron density). Of course, although the details of positron lifetime values depend on the charge states of vacancies, lattice relaxation and the like, the fact that the approximate value is given by such a simple parameter is an excellent feature as a means to detect vacancies.

The principle of lattice defect detection using positron annihilation will be explained below.

Positrons are supplied by $\beta^+$ decay of radioisotopes or the production of positron-electron pairs from high energy photons. As generally used $\beta^+$ decay-type radioisotopes, there are $^{22}$Na (half-life of 2.6 years), $^{58}$Co (half-life of 70.8 days), $^{64}$Cu (half-life of 12.7 hours), $^{11}$C (half-life of 20.4 minutes), $^{13}$N (half-life of 10 minutes), and the like. Positrons from $\beta^+$ decay have a continuous spectrum whose maximum energy is on the order of from 0.5 MeV to 2 MeV. Electrons and positrons can be pair-produced upon transmission of high intensity gamma rays through a heavy metal target, generated by bremsstrahlung of high energy electrons having an energy of an order of 100 MeV accelerated by an electron linac and directed onto the heavy metal target. In this case, the energy of the pair-produced positrons exhibit a continuous energy spectrum broadened to a maximum value on the order of the acceleration energy of the electrons. Generally, a $\beta^+$ decay radioisotope is used as a positron source. For example, because $^{22}$Na has a long half-life and is relatively easy to obtain and handle, it is used in the form of $^{22}$NaCl or the like, as the source. $^{22}$NaCl is usually enclosed in a capsule formed from an extremely thin titanium foil or the like, and held by a source holder as described later.

When positrons are incident on a material, they rapidly lose their kinetic energy due to ionization, phonon excitation and the like, and achieve thermal equilibrium with the lattice. The process wherein positrons achieves such a thermal equilibrium state is known as thermalization, and positrons are thermalized within the order of $10^{-12}$ seconds. The thermalized positron diffuses into the material until it annihilates with an electron. The time period until thermalized positron annihilates with an electron is on the order of $10^{-10}$ to $10^{-7}$ seconds, at which time two γ rays having energy of about 511 kev are emitted by one pair-annihilation event. In the diffusion process from thermalization to pair-annihilation with an electron, positrons receive repulsive forces from the nuclei that form the material due to Coulomb interaction. As a result, in perfect crystals, positrons exist in interstitial positions, and the amount of positrons which annihilate with free electrons is higher than that of positrons which annihilate with core electrons in the case of metals, while the amount of positrons which annihilate with valence electrons is higher than that of positrons which annihilate with core electrons in the case of semiconductors. Also, if vacancy-type defects exist, the amount of positrons trapped at vacancy-type defects is higher than that of positrons trapped at interstitial positions, and thus positrons are selectively trapped at vacancy-type defects and they annihilate with electrons. Consequently, the time period from when a positron is injected into a material until they annihilate with electrons varies according to the concentration and the form of defects. Accordingly, by determining the time period from when each positron is injected into a material until it annihilates, that is, the positron lifetime, the defects existing in the material can be evaluated.

FIG. 1 shows a process wherein a positron emitted from a radioisotope ($^{22}$Na) is injected into a material and annihilates with an electron. When $^{22}$Na is used as the positron source, $^{22}$Na emits γ rays of 1.28 MeV upon $\beta^+$ decay, therefore these γ rays can be used as a signal to indicate that positrons are injected into a sample. When positrons are generated using $^{22}$Na, after firstly detecting γ rays of 1.28 MeV simultaneously generated with positrons, the time when γ rays of about 511 keV emitted by pair-annihilation of each positron incident on the sample with an electron is detected is measured. By determining differences in the detected times of the γ rays of 1.28 MeV and the γ rays of about 511 keV, a positron lifetime spectrum can be obtained.

Also, if electrons are moving prior to annihilation, the energy distribution of the γ rays is broadened by the Doppler effect, because their energy and momentum are conserved before and after pair-annihilation. Therefore, by measuring the energy distribution of the annihilation γ rays, the momentum distribution of the electrons annihilated can be measured. The energy Eγ of the annihilation γ ray is shown in the following Eq.:

$$E\gamma = E_o \left[1 \pm \frac{v}{2c} \cos\theta\right] \quad (1)$$

wherein, v is the velocity of an electron, c is the velocity of light, θ is the angular deviation between the γ rays and the movement direction of the electron, and $E_o = m_o c^2 = 511$ keV ($m_o$ is the rest mass of electron). If the component along the emission direction of the γ ray of the momentum of the electron with which positron annihilates is given as $P_L$, Eq. 1 can be transformed as follows.

$$E\gamma = m_o c^2 \pm \frac{cp_L}{2} = m_o c^2 \pm \Delta E \quad (2)$$

Eq. 2 shows that the broadening of energy around 511 keV corresponds to the momentum component of the electron.

Even if the current highest level detector is used, the extent of Doppler broadening is only approximately two to three times the resolution thereof. Therefore, changes in Doppler broadening are generally evaluated using the ratio of the counts in the central region to the total counts of the Doppler broadening, given as the S parameter. The value of the S parameter increases with the sharpening of the Doppler broadening.

FIG. 2 shows conditions where positrons are trapped at vacancy-type defects in metal taken as an example. As shown in FIG. 2(a), because positrons receive repulsive forces from the nuclei due to Coulomb interaction as described above, they exist in interstitial locations. On the other hand, as shown in FIG. 2(b), if vacancy-type defects exist, the probability that positrons will localize at the defects increases. As described above, annihilation γ ray Doppler broadening reflects the momentum distribution of the electrons with which positron annihilate, and within the defects, the Doppler broadening is sharper than that in the bulk, because the annihilation probability of positrons with core electrons having broad momentum distribution is lower than that in the bulk. Thus, the S parameter is large. As shown in FIG. 2(c), this tendency increases with the increase of the void size of the vacancy-type defects. The concentration and type of the vacancy-type defects can be evaluated by determining the magnitude of the S parameter. Further, within the vacancy-type defects, the lifetimes of electrons are longer than that in the bulk because the electron densities within the vacancy-type defects are lower than that of the bulk.

Consequently, the momentum distribution of electrons can mainly be obtained by measuring the Doppler broadening of annihilation γ rays, and then the electronic state in the vicinity of positron annihilation positions can be evaluated, and also the vacancy-type defects mainly in annihilation positions can be evaluated by measuring the positron lifetimes. Further, complex defects of vacancy and impurity can be evaluated by these techniques.

A prior art defect evaluation apparatus using such positron annihilation phenomenon is well known in the art and is disclosed in Japanese Unexamined Patent Publication (Kokai) No. 7-270598, for example.

The positron generating apparatus disclosed in Japanese Unexamined Patent Publication (Kokai) No. 7-270598 comprises a source section for generating positrons, a moderator (also referred to as "moderating material") for decelerating the positrons generated by the source section, a sample section in which a semiconductor detector for detecting annihilation γ rays is disposed and the positions are directed on a sample, a transfer section for guiding the positron beam decelerated by the moderator into the sample section, a shielding section disposed in the vicinity of the source section, an acceleration section for accelerating the positrons, a beam position fine adjustment section for correcting the positron beam, a discrimination section for eliminating high speed positrons and electrons, and a linearizing section for converting a pulsed beam to a direct current. This positron generating apparatus made it possible to focus a number of positrons by arranging a plurality of radioisotopes and curving the structure of the moderator. Further, this apparatus made it possible to reduce exposure during maintenance by providing shielding plates for shielding positrons and γ rays generated from radioisotopes during maintenance and an infrared radiation generating apparatus for annealing the moderator inside the positron generating apparatus.

In precisely evaluating lattice defects in the vicinity of the surface of materials to be measured using positrons, it is necessary to use slow positrons with monochromatic energy distributions. In order to obtain such slow positrons with monochromatic energy distributions, generally, high energy positrons with large energy distributions (0 to 0.5 MeV) emitted from $\beta^+$ decay radioisotopes of $^{22}$Na or the like as described above are injected into a metal such as tungsten (W) or the like, referred to as "moderator", and extracted within a vacuum after removing their energy by inelastic scattering within the moderator. The conditions required for a moderator to effectively obtain desired positrons are that the moderator is defect-free, that the surface is clean and that the position work function is negative. Generally, because lattice defects will be introduced into the moderator and the surface cleanness will be reduced during long periods of use, the moderator must be periodically annealed. Further, in a defect evaluation apparatus using positrons, it is necessary for the entire path of the positrons including the radioisotopes, the moderator, and the sample to be measured to exist in the same vacuum from generation of the positrons till their arrival at the sample to be measured.

Conventionally, in order to obtain a defect-free moderator with a clean surface, the moderator is annealed by heating it at a temperature which is typically between 2000 and 2500° C. after removing it from the vacuum formed within the defect evaluation apparatus. However, when this operation is performed, until the moderator is reinserted in the positron generating apparatus after annealing, defects introduced into the moderator by impacts or the like due to attaching the moderator to a pedestal in the air cannot be avoided, and contaminants in the atmosphere attaching themselves to the surface of the moderator cannot be avoided until the moderator is reinserted into the defect evaluation apparatus and restored to a vacuum state. Also, even when the moderator is annealed without being removed from the defect evaluation apparatus, because the annealing temperature is high, the source, other equipments required for measurement, the vacuum container, and the like must be protected from the heat generated during annealing, therefore a mechanism for substantially separating the moderator from the source or a mechanism for thermally protecting the source and the like must be provided, which inevitably makes an increase in the scale of the apparatus.

In particular, when a radioisotope is used as a source and the moderator is annealed without removing it from the defect evaluation apparatus, the source must be protected from the radiation of photons from the heating device, since radioactive leakage must not occur and degeneration of the source due to the heat is not desirable, the source requires protection from heat. Even in a defect evaluation apparatus that utilizes high energy positrons generated upon transmission of high intensity γ rays through a heavy metal target, generated by bremsstrahlung of high energy electrons accelerated by an electron linac and directed onto the heavy metal target, it is necessary to prevent temperature increases in the heavy metal target and other components for supporting the heavy metal target (such as insulation components that are not heat resistant) when the moderator is being annealed.

Further, as a prior art heating apparatus used for annealing a moderator, there is one which uses infrared rays, as disclosed in Japanese Unexamined Patent Publication (Kokai) No. 7-270598, but this is insufficient for uniformly annealing the moderator at a high temperature, typically of from 2000 to 2500° C., necessary for lowering the lattice defect concentration.

Also, in prior art defect evaluation apparatus utilizing positrons, there is generally a disadvantage that the noise level increases and the signal to noise (S/N) ratio decreases with the reduction in the size of the apparatus.

SUMMARY OF THE INVENTION

The present invention has been achieved in view of such disadvantages of the prior art, and one of its objects is to provide a defect evaluation apparatus in which the moderator can be heated to a high temperature necessary for annealing it without being removed from the defect evaluation apparatus, and the cleanness of the surface of the moderator can be maintained.

Another object of the present invention is to minimize the effect of heat that affects on the source and the like inside a defect evaluation apparatus utilizing positrons during heating of the moderator.

Another object of the present invention is to downsize a defect evaluation apparatus utilizing positrons without sacrificing accuracy of measurement.

Another object of the present invention is to improve the production efficiency of slow positrons in a defect evaluation apparatus utilizing positrons.

Another object of the present invention is to reduce the frequency of maintenance and amount of exposure of a defect evaluation apparatus utilizing positrons.

Another object of the present invention is to improve the S/N ratio of a defect evaluation apparatus utilizing positrons.

Another object of the present invention is to provide a defect evaluation apparatus utilizing positrons having improved S/N ratio while having smaller size as compared to prior art defect evaluation apparatuses that utilize positrons.

BRIEF DESCRIPTION OF THE DRAWINGS

FIG. 3 is a schematic view of a prior art slow positron generating apparatus.

DESCRIPTION OF THE PREFERRED EMBODIMENTS

Figure 1:
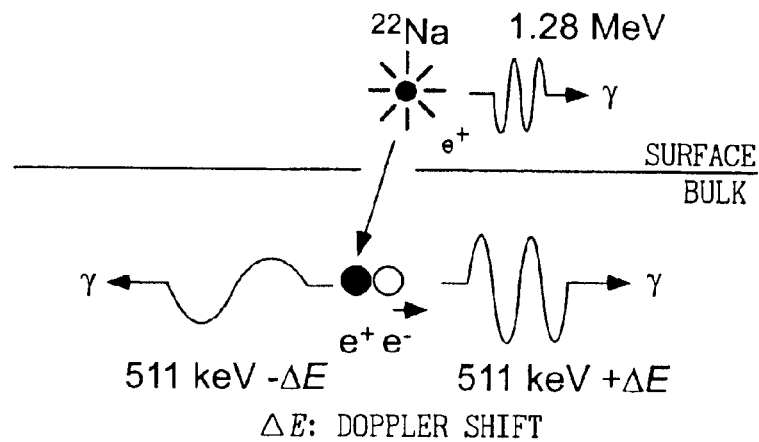
FIG. 1 is a schematic view of the process of annihilation of a positron emitted from a positron source (22Na) with an electron to emit γ rays.
Figure 2:
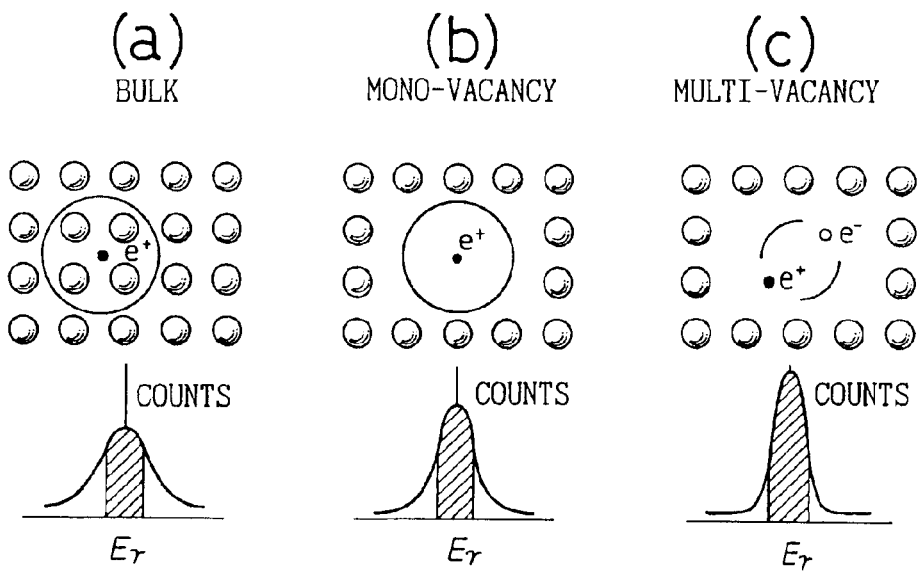
FIG. 2 is a schematic view showing positrons trapped by vacancy-type defects and changes in the Doppler broadening profiles of the annihilation radiation.

The present invention, in one aspect, provides a defect evaluation apparatus, comprising a source section having a source for generating positrons and a moderator for decelerating the positrons, a sample holding section for holding a sample to be measured, a transfer section for transferring the positrons from the source section to the sample holding section, and detection means for detecting γ rays emitted from the sample being measured, characterized in that the apparatus further comprises heating means for heating the moderator in a position where there is a possibility of the source being thermally damaged if there is no protection means mentioned below in the source section, and protection means for protecting the source from the heating means and heated moderator when the moderator is being heated using the heating means.

The present invention, in another aspect, provides a defect evaluation apparatus wherein the protection means is disposed outside of the space between the moderator and the source when the positrons decelerated via the moderator are injected into the sample, and the protection means is disposed in the space between the moderator and the source when the moderator is heated by the heating means.

The present invention, in yet another aspect, provides a defect evaluation apparatus wherein the heating means faces the moderator when the moderator is heated by the heating means.

The present invention, in still another aspect, provides a defect evaluation apparatus wherein the moderator is held by moderator holding means, the moderator holding means and the protection means are integrally formed, the moderator faces the source when the positrons decelerated via the moderator are injected into the sample, and the moderator faces the heating means and the protection means faces the source means when the moderator is heated by the heating means, whereby the source is protected from thermal attack from both the heating means and the moderator.

The present invention, in a further aspect, provides a defect evaluation apparatus wherein the moderator is held by moderator holding means, the moderator holding means and the protection means are integrally formed in an L-shape body, the L-shaped body is rotatable so that the moderator or the protection means can be made to face the source, and the moderator faces the heating means and the protection means faces the source when the moderator is heated by the heating means, whereby the source is protected from thermal attack from both the heating means and the moderator.

The present invention, in yet another aspect, provides a defect evaluation apparatus comprising a source section having a source for generating positrons and a moderator for decelerating the positrons, a sample holding section for holding a sample to be measured, a transfer section for transferring the positrons from the source section to the sample holding section, and detection means for detecting γ rays emitted from the sample being measured, wherein the detection means is comprised of two γ ray detectors for detecting γ rays generated by annihilation of positrons and the two γ ray detectors are arranged facing each other across the sample, the two γ ray detectors are connected to a circuit for measuring the detection timing for each γ ray detected by the two γ ray detectors and for checking whether two γ rays simultaneously detected by these two γ ray detectors are two γ rays simultaneously emitted in opposite directions by the annihilation of one positron incident on the sample, whereby energy spectrums of γ rays simultaneously emitted in opposite directions by the annihilation of one positron incident on the sample and detected by the two γ ray detectors are measured.

According to the present invention, the volume of a defect evaluation apparatus utilizing positrons is approximately one tenth that of the prior art, and positron intensity is improved several fold. Since the positron intensity is improved several fold, measurement sensitivity is also improved several fold and the time required for measurement is reduced to a fraction of that of the prior art. Further, since the frequency with which the vacuum is broken to perform maintenance is approximately one tenth, and the opportunities for handling radioisotopes, i.e. exposure, is also one tenth.

FIG. 3 shows an outline of a magnetic field convergence type slow positron beamline utilizing radioisotopes. The beam intensity depends on the source intensity of the radioisotopes used, and, in the case of this type, being often on the order of $10^6$ e$^+$/s. In a source section chamber 310, radioisotopes 312 for emitting positrons, a source holder 313 for holding the radioisotopes 312, and a moderator 311 for decelerating the positrons emitted from the radioisotopes 312 are provided. The positrons emitted from the radioisotopes 312 are incident on the moderator 311 and are converted to slow positrons. The slow positrons emitted from the moderator 311 are extracted in the direction to the sample by magnetic and electric fields. Between the source section chamber 310 and the sample section chamber 330 an energy discriminator 320 for separating high energy positrons and slow positrons and delivering only the slow positrons to the sample section chamber 300 is provided. As an energy discrimination method, a method of bending the positron beam at an angle of, for example, 45° by a magnetic field, or changing the orbit by means of a electric field and magnetic field (E×B filter) is generally used. After achieving energy discrimination, a voltage is applied to an accelerating tube 321 to accelerate the slow positrons to a desired energy. The positrons that have been accelerated to a desired energy are injected into a sample 331. The energy distribution of annihilation γ rays emitted from the sample 331 is measured by a semiconductor detector 340. 322 is a coil for generating a magnetic field for transferring positrons. In the source section a high dose of radiations such as γ rays, and the like are generated, therefore in order to prevent such radiations from becoming a background noise during the measurement, shields formed from lead or the like, not shown in FIG. 3, are generally disposed in the vicinity of the source section chamber 310. Also, in order to prevent annihilation γ rays resulting from high energy positrons from reaching the source, similar shields are also arranged around the energy discriminator 320 and accelerating tube 321.

Although not shown in this figure, when measuring the lifetime of positrons, generally, the positrons are formed into extremely short pulses of approximately 100 picoseconds using a pulsing apparatus, whereafter they are injected into the sample. The lifetimes of the positrons are obtained by measuring the time difference between the timing pulse of the pulsing apparatus and the annihilation γ rays detected by the γ ray detectors.

Figure 4A:
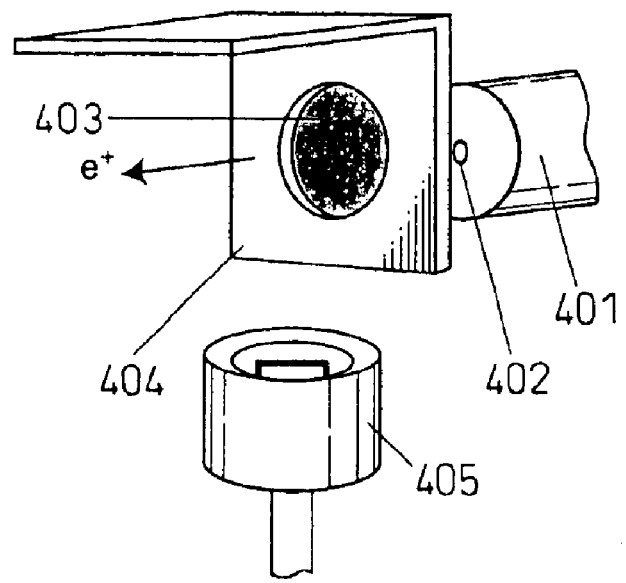
FIG. 4($a$) is a schematic view showing the arrangement of the moderator of the present invention when slow positrons are generated, and FIG. 4($b$) shows the arrangement of the moderator of the present invention when the moderator is annealed.
Figure 4B:
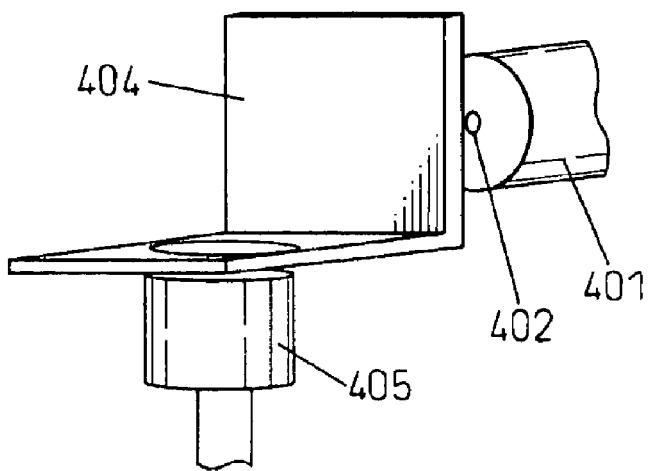

In FIGS. 4(*a*) and 4(*b*), the arrangements of the source, moderator and heating means when the slow positrons are generated and when the moderator is annealed, according to an embodiment of the defect evaluation apparatus of the present invention, are shown. FIG. 4(*a*) is an outline of when the positrons generated by the source 402 are decelerated by the moderator 403, and FIG. 4(*b*) is an outline of when the moderator 403 is annealed by the heating means 405. In both FIG. 4(*a*) and FIG. 4(*b*), the moderator 403 is held by moderator holding means 404, the source (radioisotopes) 402 and heating means (an electron beam generator) 405 for heating and annealing the moderator 403 are disposed in the vicinity of the moderator 403. When the slow positrons are generated, the gap between the moderator and the source is typically 1 mm or less. The moderator holding means 404 shown in FIG. 4(*a*) and FIG. 4(*b*) has an L-shaped form as one embodiment. Where the moderator holding means 404 has such an L-shaped form, it can also have the function of protecting means for protecting the source 402 from heat generated from the moderator 403 and heating means 405 during annealing of the moderator 403. When the moderator 403 is to be heated, the moderator 403 can be made to face the heating means by a moderator moving means (not shown) connected to the moderator holding means 404. As long as at least the source 402 and the like are protected from the heat generated from the moderator 403 and the heating means 405 when the moderator being heated, the moderator holding means 404 can have any other configuration. From the viewpoint that the effect of heat due to leakage and scattering of the electron beam from the electron beam generator can be minimized when an electron beam generator is used as the heating means 405, the feature that the moderator holding means has an L-shaped form and the moderator holding means 404 is disposed between the heating means 405 and the source 402 when heating the moderator as shown in FIG. 4(*b*) is highly effective. When using an electron beam generator as the heating means 405, the electron beam generator faces the moderator 403 in a direction substantially vertical to the orbital direction of the electrons in the embodiment shown in FIG. 4(b). However, as long as at least the source 402 and the like are protected from the effects of heat generated from the moderator 403 and the electron beam generator and heat due to leakage and scattering of the electron beam from the electron beam generator during heating of the moderator 403, they are not restricted to the arrangements shown in FIG. 4(a) and FIG. 4(b). Effective materials for forming the moderator holding means 404 are preferably materials with high heat resistance that can withstand annealing temperatures, such as tantalum, tungsten, molybdenum and the like.

In FIG. 4(a), the source 402 is positioned to the right side of the moderator 403 as seen from the front of the drawing, high energy positrons are incident on the moderator 403 and are decelerated in the moderator 403, and then are emitted from the moderator 403 as slow positrons. When a voltage is applied to the moderator 403, the positrons decelerated by the moderator 403 are subsequently accelerated according to the voltage and transferred to the direction to the sample.

In FIG. 4(b), the heating means 405 is disposed below the moderator 403 and faces with the moderator 403, and when an electron beam generator is used as the heating means 405, the electron beam emitted from the electron beam generator heats the moderator 403 to a predetermined temperature. When the electron beam generator is used as the heating means 405, in a state where it is facing with the moderator 403, the moderator 403 can be heated in a concentrated and uniform manner to a suitable temperature for annealing while minimizing adverse effects of heat on the source and other equipments within the defect evaluation apparatus. A typical annealing temperature when tungsten is used as the moderator 403 is a temperature between approximately 2000 and 2500° C. For example, the moderator 403 can be heated to a suitable temperature in approximately 10 minutes and annealed for between several minutes and approximately 10 minutes. The moderator holding means 404 shown in FIG. 4(a) and FIG. 4(b) also functions as a protecting means for protecting at least the source from the effects of heat generated from the moderator 403 and the electron beam generator and heat from leakage and scattering of the electron beam from the electron beam generator when the heating means 405 is heating and annealing the moderator 403, and when the positrons are injected into the sample via the moderator 403, that is, when slow positrons are generated, the moderator holding means 404 is disposed outside of the space between moderator 403 and source 402 and when the moderator is being heated for annealing, the moderator holding means is disposed in the space between the moderator 403 and the source 402.

Also, when a distinct protecting means from the moderator holding means is provided and the positrons decelerated by the moderator are to be injected into the sample, the protecting means can be moved outside of the space between the moderator and the source, and when the moderator is to be heated, the protecting means can be moved to the space between the moderator and the source. In the embodiment shown in FIG. 4(a) and FIG. 4(b), the moderator holding means 404 can also have the function of protecting means as described above. When the moderator and the protecting means are integrally formed in an L-shaped form in this way, as well as moving the moderator so as to face the heating means, the protecting means can be moved to the space between the moderator and the source, therefore the source section chamber can be made more compact and the defect evaluation apparatus can be reduced in size.

The moderator, the source and the heating means are configured so that, for example, when the moderator is to be heated after generating slow positrons via the moderator as shown in FIG. 4(a), the moderator holding means 404 can be rotated together with the moderator 403 around an axis perpendicular to the orbit of the slow positrons emitted from the moderator 403, and the moderator 403 and the heating means 405 can face each other. This rotation can be performed using a rotation guide terminal, for example.

Although not shown in FIG. 4(a) and FIG. 4(b), movable means for moving the source away from the moderator so that the moderator is rotatable when the moderator is to be rotated for heating the moderator by the heating means and then making the heating means face the moderator after the positrons decelerated via the moderator as described above are injected into the sample, and for moving the heating means away from the moderator so that the moderator is rotatable when the moderator is to be rotated for injecting the positrons decelerated via the moderator into the sample and then making the moderator face the source after the moderator is heated by the heating means is linked to at least one of the source, moderator holding means and heating means, and can adjust the positions of the source, moderator holding means and heating means. Such movable means include, for example, a linear guidance terminal and rotating guidance terminal.

Figure 5A:
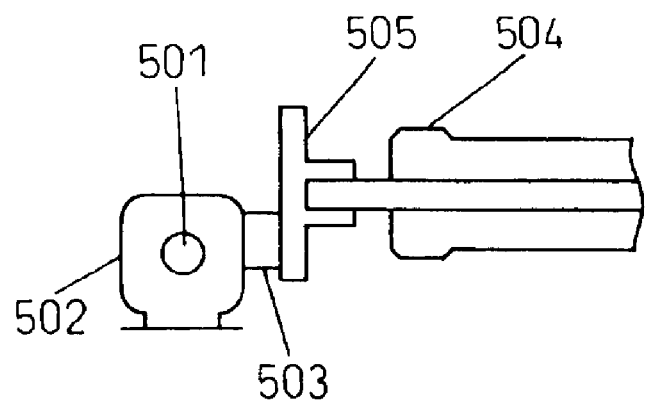
FIG. 5($a$) is a schematic view showing an embodiment of a moderator and moderator movable means, and FIG. 5($b$) is a schematic view showing an embodiment of the defect evaluation apparatus of the present invention, showing the arrangement of the moderator, source and electron beam generator where an electron beam generator is used as the heating apparatus, in the direction in which positrons are emitted from the source in the source section chamber.
Figure 5B:
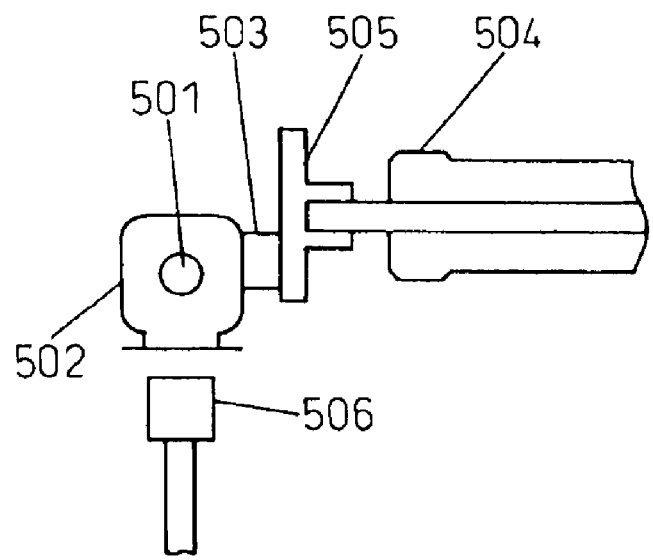

In one embodiment of the defect evaluation apparatus of the present invention the moderator holding means 502 and the moderator 501 can be rotated around an axis perpendicular to the orbit of the positrons using, for example, a moderator movable means 504 as shown in FIG. 5(a) and FIG. 5(b). FIG. 5(a) shows an example of a mechanism for supporting the moderator and the moderator holding means in the source section chamber in an embodiment of the defect evaluation apparatus of the present invention, and FIG. 5(b) is a schematic drawing showing the arrangement of the moderator holding means 502, the moderator 501 and the moderator movable means 504 seen from the source in a direction parallel to the orbit of the positrons, when slow positrons are emitted, in an embodiment of the present invention. In FIG. 5(a), the moderator holding means 502 is linked to the moderator movable means 504 via a support means 503 for supporting the moderator holding means 502, and the rotating plate 505 for rotating the moderator holding means around an axis perpendicular to the orbital direction of the low velocity positrons. In rotating the moderator 501, in FIG. 5(a) for example, although the moderator movable means 504 must rotate the rotating plate 505 around the axis thereof, the moderator movable means 504 itself can move along that axis.

In FIG. 5(b), the heating means (electron beam generator) 506 for annealing the moderator is disposed underneath the moderator holding means 502. Practically, the heating means 506 is disposed in a position where it faces with the moderator 501 when the moderator 501 is rotated by the moderator movable means 504 to anneal the moderator 501. In FIG. 5(b), 503 is support means for supporting the moderator holding means 502, and the moderator movable means 504 has a rotating plate 505 that rotates around an axis perpendicular to the orbit of the positrons. The moderator holding means 502 can be rotated around the axis of this rotating plate, and the moderator 501 can be rotated along with it. In the embodiment shown in FIG. 5(b), although the orbital direction of the positrons and the electron beam emission direction of the electron beam generator 506 are substantially perpendicular, other arrangements are possible, as long as the source (not shown) is protected from the heat derived from the heating of the moderator 501 and the heating of the electron beam generator itself, as well as heat due to leakage and scattering of the electron beam from the electron beam generator, when the moderator is annealed as described above.

By using a movable means such as a linear guiding terminal as described above, radioisotopes can be inserted in a predetermined position within the source section chamber, and the amount of exposure associated with handling the radioisotopes can be reduced. Moreover, temperature increase in the source during annealing of the moderator can be further prevented, by separating the moderator from the source using such movable means when annealing the moderator. The position of the source can also be minutely adjusted using such movable means. By providing the same type of movable means in the moderator and heating means, their positions can also be minutely adjusted.

Actually, since the moderator is extremely thin with a thickness on the order of 1 $\mu$m, the moderator is held by some kind of holding means, and if the moderator holding means also functions as a protection means for protecting the source from heat when the moderator holding means being annealed, the moderator and such holding means can be considered as being integrally formed. It is possible to rotate and/or move such moderator holding means to make the moderator face the source, and when the moderator is heated by the heating means, the source can be protected from heat attack from both the heating means and the moderator by making the protecting means face the source and making the moderator face the heating means.

When the moderator holding means and protecting means are integrally formed in an L-shaped body, it is preferred that the heating means is in the vicinity of the moderator when the moderator is heated for annealing and that the moderator is in the vicinity of the source when slow positrons are generated via the moderator, and therefore the movable means for minutely adjusting positions is preferably linked to the moderator, the source and the heating means in such a manner as the source can be moved away from the moderator so that the moderator is rotatable when the moderator is to be rotated in order for the heating means to heat the moderator and the moderator is then made to face the heating means, then after the moderator is heated by the heating means, the heating means can be moved away from the moderator so that the moderator is rotatable when the moderator is to be rotated in order for the positrons decelerated via the moderator to be injected into the sample and the moderator is then made to face the heating means.

Figure 6:
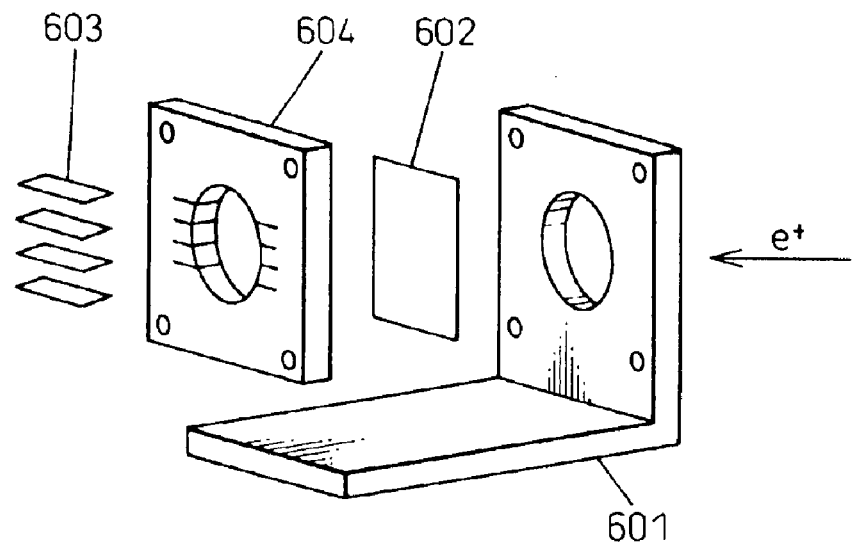
FIG. 6 is a schematic view showing the structure of the moderator used in an embodiment of the defect evaluation apparatus of the present invention.

Next, another embodiment of the moderator will be described with reference to FIG. 6. This figure shows an example wherein the moderator is comprised of a combination of a tungsten thin film and a plurality of parallel tungsten ribbons. The plurality of tungsten ribbons 603 are inserted into a plurality of slits provided in parallel at predetermined intervals in a ribbon support means 604 so that their in-plane directions are substantially parallel to the orbital direction of the positrons and their lengthwise directions are perpendicular to the orbital direction of the positrons. In the configuration shown in FIG. 6, the tungsten thin film 602 is sandwiched between the ribbon support means 604 and the moderator holding means 601. The ribbon support means 604 can be fixed to the moderator holding means 601 by means of conventional fixing means such as screws or the like. In another embodiment, in addition to the ribbon support means 604, a tungsten mesh can be arranged as a structural component of the moderator existing in a plane normal to the orbital direction of the positrons and intersect with the orbit of the positrons using another support means. For example, in FIG. 6, such a tungsten mesh can be disposed on the left side of the tungsten ribbons 603 as seen from the front of the drawing. Although this figure shows an example of a combination of a tungsten thin film and tungsten ribbons, the tungsten thin film alone can be used, or the plurality of parallel tungsten ribbons can be used. Not only tungsten moderator a moderator selected from among a thin film moderator, a ribbon shaped moderator, or a combination of a thin film moderator and ribbon shaped moderator, made from a material that is suitable for a moderator can be used. However, when such a combination of a tungsten thin film 602 and a plurality of parallel tungsten ribbons 603 is used as the moderator as shown in FIG. 6, it has been found that the emission efficiency of slow positrons from the moderator is higher than that of the tungsten thin film 603 alone or the plurality of tungsten ribbons arranged in parallel. In particular, where the installation interval of the tungsten ribbons, i.e. the gap between adjacent parallel tungsten ribbons, is given as D and the width of the tungsten ribbons, i.e. the dimension of the tungsten ribbons in a direction parallel to the orbital direction of the positrons, is given as W, it was found that the production efficiency of slow positrons is high in the case where D/W=0.3 to 1.2, the production efficiency increases further where D/W=0.4 to 1.0, and increases even further where D/W=0.6 to 0.8.

The thickness of the tungsten thin film 602 and the dimensions of the tungsten ribbons 603 can be changed as needed. Although the thickness of the tungsten thin film is typically on the order of about 1 micrometer, and the diameter of the moderator, i.e. the diameter of the opening portion of the moderator holding means, is on the order of 10 mm, for example, the size of the elements constituting the moderator, such as the tungsten thin film, tungsten ribbons and the like, and diameter of the moderator can have other arbitrary values. As the material of the moderator, any conventional material which has a negative work function and can thermalize high energy positrons and emit them onto a surface thereof can be used. Therefore, in addition to tungsten, materials such as nickel, iridium and the like, can also be used.

The moderator can be annealed in the arrangement with respect to the heating means and the source as shown in FIG. 5(*b*), for example.

As a mechanism for annealing the moderator proposed heretofore, there is a mechanism in which a separate heating chamber is provided and the moderator is annealed therein using an infrared generating apparatus as the heating means as described above. Where the moderator is annealed in a separate heating chamber in such a way, a means of moving the moderator from the vicinity of the source to the heating chamber is necessary and as a result an increase in the size of the apparatus is unavoidable.

In another embodiment of the defect evaluation apparatus of the present invention, the diameter of an electron beam emission hole of the electron beam generator is substantially equal to the diameter of the moderator, and when the moderator is annealed, the electron beam generator and moderator are arranged such that the electron beam emission hole of the electron beam generator is in the vicinity of the moderator and the electron beam generator faces the moderator. In such an arrangement, the moderator can be heated in a concentrated or substantially uniform manner to a desired annealing temperature without having adverse effects on the source or other equipment within the apparatus. Where the moderator is heated using an electron beam generator, a potential difference is applied between the moderator and the cathode of the electron beam generator.

In annealing the moderator, to achieve a certain annealing effect, it is preferable to uniformly heat the moderator at a predetermined annealing temperature as described above. Also, with the object of minimizing the adverse effects of heat on the source and other equipments around the moderator, it is preferable to heat the moderator in a concentrated manner. Consequently, when annealing the moderator using an electron beam generator, it is preferable that the electron beam generator is in the vicinity of the moderator and irradiates the moderator with electron beams in a concentrated and substantially uniform manner.

As a filament provided in the cathode of the electron beam generator that can be used in one embodiment of the defect evaluation apparatus of the present invention, any type of filament can be used, and one that emits substantially parallel electron beams is preferred when the electron beam generator is in the vicinity of the moderator and annealing is performed from the viewpoint that at the same time as it can heat the moderator in a concentrated and uniform manner to a predetermined annealing temperature, it can also minimize the effects of heat on the source and other components. As this type of filament, there is the filament used in reflection high-energy electron diffraction (RHEED) electron beam generators. Filaments used in RHEED electron beam generators are commercially available. Although filaments used in RHEED electron beam generators are generally depend on a variety of factors such as shape, bias voltage, and the like, they can irradiate the moderator with substantially parallel electron beams.

Figure 7:
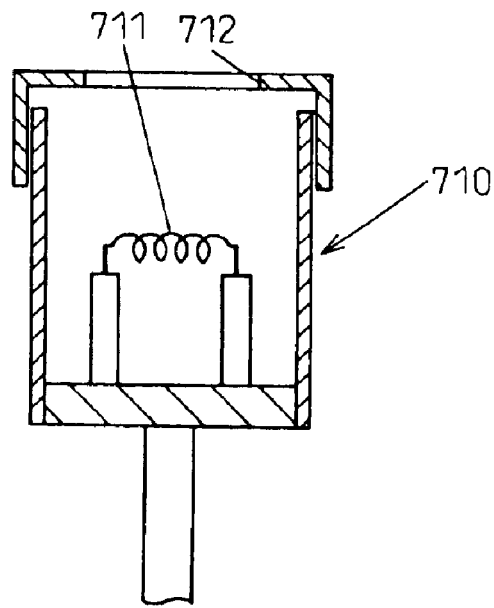
FIG. 7 is a schematic view showing the electron beam generator used in an embodiment of the defect evaluation apparatus of the present invention.

FIG. 7 shows a schematic sectional view of an example of an electron beam generator used in the defect evaluation apparatus of the present invention. Although the diameter of an opening section 712 at which an electron beam of an electron beam generator 710 is emitted can be changed according to the diameter of the moderator, the electron beam generator can heat the moderator to a predetermined annealing temperature without the adverse effects on the source and other components by making the diameter of the opening section 712 substantially the same as the diameter of the moderator, and positioning the opening section 712 close to and facing the moderator. 711 is a filament for emitting electron beams. In the defect evaluation apparatus according to the present invention, because it is contemplated that the convergence and collimation of the electron beam depend on a variety of factors such as the diameter of the moderator, the distance between the electron beam generator and the moderator during annealing of the moderator, the electrical characteristics of the electron beam generator and the like, the convergence and collimation of the electron beam emitted from the electron beam generator can be adjusted using a lens such as an electric field lens or the like, so that the moderator can be uniformly heated to a predetermined annealing temperature. Even when a lens for adjusting the convergence and collimation of the electron beam in this manner is not used, the moderator can be uniformly heated to a predetermined annealing temperature by making the diameter of the electron beam emission hole of the electron beam generator substantially the same as the diameter of the moderator and placing the electron beam generator in the vicinity of the moderator when annealing the moderator. However, in the present invention, where an electron beam generator is used as the heating apparatus for annealing the moderator, there is no reason for excluding the use of a lens such as an electric field lens for adjusting the convergence and collimation of the electron beam.

The incorporation of a heating apparatus for annealing the moderator having these characteristics in the source section chamber allows a downsizing of the source section chamber of the defect evaluation apparatus utilizing positrons, minimization of undesirable heating of the source and other equipments, and a great reduction of exposures of workers with great reduction of the frequency of maintenance of the moderator. Although an electron beam generator such as that described above is preferable as the heating apparatus for annealing the moderator, there is no reason for excluding the use of other heating apparatuses such as infrared beam generators and the like, so long as they can uniformly heat the moderator to the temperature necessary for annealing. Also, because the spot diameter of the electron beam can generally be adjusted by changing a variety of factors such as the shape of the filament etc of the electron beam generator, the bias voltage, and the like, the electron beam generator does not necessarily have to be in the vicinity of the moderator when annealing the moderator. However, if the electron beam generator is closer to the moderator, broadening of the spot diameter of the electron beam can be prevented and annealing of the moderator can be more suitably preformed. In the defect evaluation apparatus of the present invention, the emission efficiency of slow positrons can be increased, because the moderator can be heated in a substantially uniform manner at a predetermined annealing temperature.

Conventionally, the attainable heating temperature was 900° C. at the most when an infrared heating apparatus was used, and therefore an electron beam generator as described above is preferable as a heating apparatus for annealing the moderator. However, in the defect evaluation apparatus of the present invention, the heating means is not limited to an electron beam generator, as long as the moderator can be heated to a predetermined annealing temperature.

Figure 8:
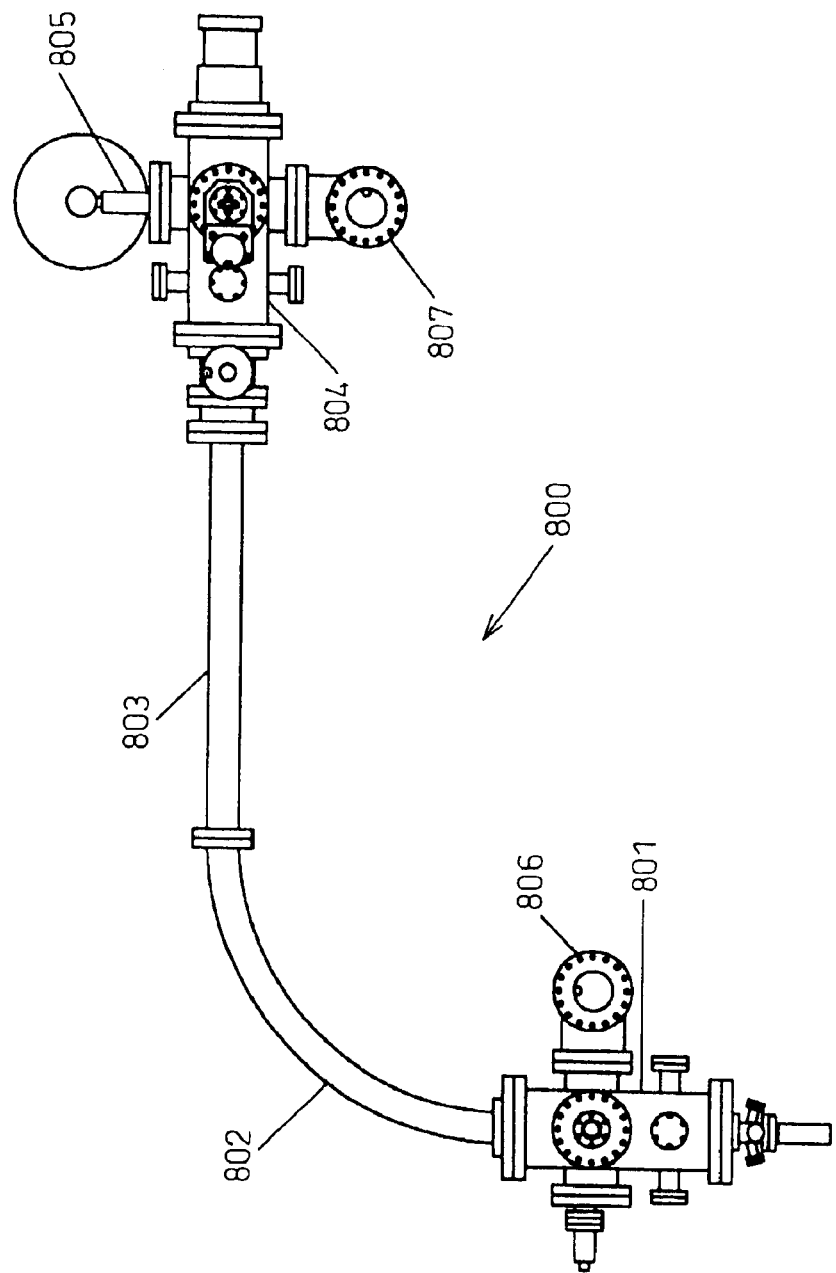
FIG. 8 is a schematic view showing an embodiment of the defect evaluation apparatus of the present invention.

Next, another embodiment of the defect evaluation apparatus according to the present invention will be described with reference to FIG. 8. This figure shows an overview of one embodiment of the defect evaluation apparatus according to the present invention. The defect evaluation apparatus 800 comprises a source section chamber 801, a curved section 802 for achieving energy discrimination, a linear section 803 for reducing background noise, a sample chamber 804 for holding a sample, and a γ beam detector 805 installed in the sample chamber 804. Radioisotopes as a positron source, a moderator for decelerating positrons generated by the source, and a heating apparatus for heating the moderator are all included in the source section chamber 801, although they are not shown in this figure. Also, although not shown in this figure, shielding means made from lead or the like are disposed around the source section chamber, and prevents radiations of large amounts of γ rays etc emitted from the radioisotopes in the source section chamber 801 from causing background noise during measurement.

In order to attain an ultra-high vacuum, vacuum pumps 806 and 807 for example are connected to the source section chamber 801 and the sample chamber 804. As vacuum pumps, turbo pumps that can achieve a vacuum on the order of $10^{-8}$ Torr can be used. In the case of a slow positron experiment, a vacuum on the order of $10^{-7}$ Torr is sufficient. In order to transport positrons, a transport section comprising the source section chamber 801, the curve section 802 and the linear section 803, and a coil (not shown) for generating a magnetic field in the sample chamber 805 are provided. In order to correct the beam trajectory, coils (not shown) are provided in front of the curve section in the horizontal direction and vertical direction of the beam.

According to the present invention, because it is not necessary to provide a separate heating chamber for annealing the moderator, and moving means for guiding the moderator into the separate chamber, as proposed in the prior art, the source section chamber can be greatly reduced in size. For example, in the defect evaluation apparatus of the present invention, the installation area thereof can be reduced to approximately 2×1.5 m². Further, by increasing the shielding integrity, or by installing two detectors in the sample chamber as described below, the linear section 803 of the apparatus can be omitted, and therefore the size of the overall apparatus can be further reduced and the installation area can be made, for example, approximately 1.5×1.5² m . Although radioisotopes are mainly described for the purpose of illustration of the source for emitting positrons herein, there is no reason to exclude generating positrons using an electron linac.

Coincidence Doppler Broadening Method Next

Figure 9:
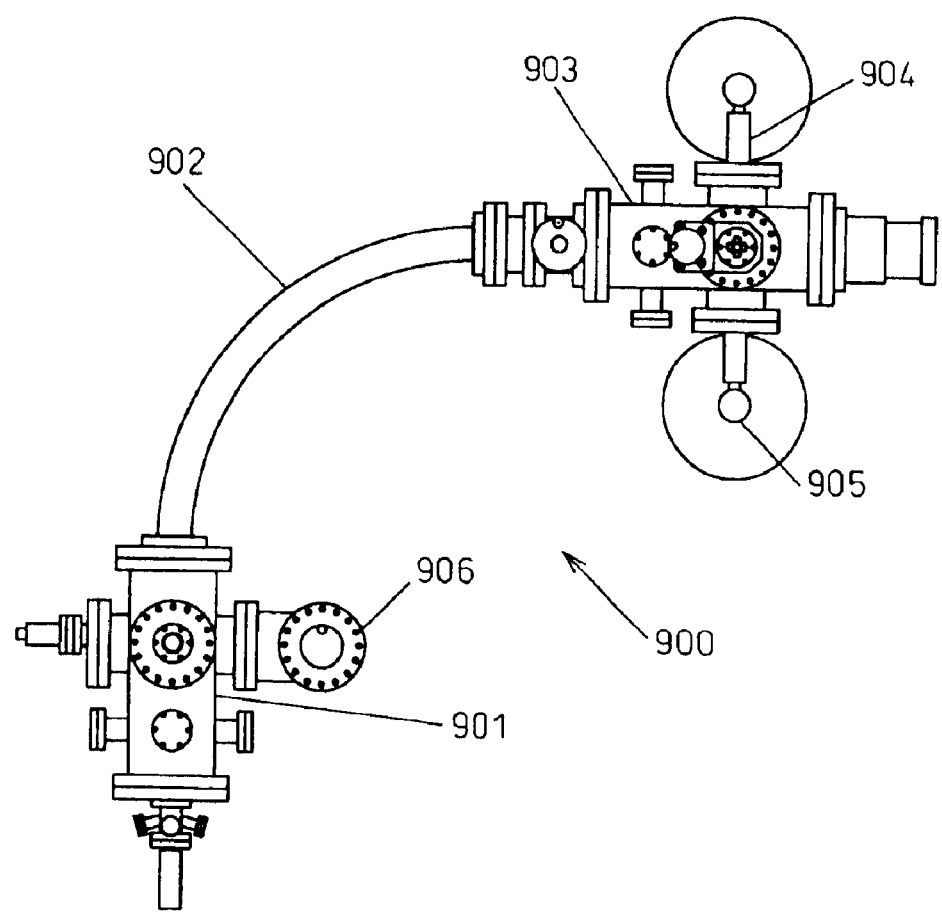
FIG. 9 is a schematic view showing an embodiment of the defect evaluation apparatus of the present invention when lattice defect evaluation is performed using the coincidence Doppler broadening method.

Next the coincidence Doppler broadening (CDB) method will be explained. The coincidence Doppler broadening method is a method of determining the momentum distribution of electrons by measuring the energy distribution of γ rays created by the annihilation of positrons and electrons using two γ ray detectors arranged facing each other across a sample by measuring the input timing of each γ ray detector and detecting the simultaneity of γ ray emissions detected by both γ ray detectors. Conventional semiconductor detectors, for example high purity Ge detectors, can be used as the γ ray detectors. According to this method, the momentum distribution of core electrons, particularly those having a large momentum can be determined more precisely. By using this method, the signal to noise (S/N) ratio is improved, the defect evaluation apparatus of the present invention can be further miniaturized, and the installation area can be made even smaller. When using the coincidence Doppler broadening method, the defect evaluation apparatus according to the present invention shown in FIG. 8, for example, can be further miniaturized as shown in FIG. 9. The defect evaluation apparatus 900 does not have the linear section indicated by 803 in FIG. 8, and has two γ ray detectors 904 and 905 connected to the sample chamber 904 that holds the sample. These two γ ray detectors are arranged facing each other across the sample. 901 indicates the source section chamber, and 902 indicates the curve section for achieving energy discrimination. 906 indicates a vacuum pump for creating an ultra-high vacuum in the beam line as explained with regard to FIG. 8.

The measurement principle of the coincidence Doppler broadening method will be explained below.

1. Measurement Principle of the Coincidence Doppler Broadening Method

Each of two γ rays emitted by pair-annihilation of a positron and an electron are referred to as $\gamma_1$ and $\gamma_2$ and their respective energies are referred to as $E_1$ and $E_2$. The sum of the energies of the two γ rays $E_1+E_2$ is given as the following Eq.:

$$E_1+E_2=2mc^2-E_B \quad (3)$$

wherein, $m_o$ is the rest mass of electron, c is the velocity of light, and $E_B$ is the binding energy of the electron and positron to the solid. Further, $E_1$ and $E_2$ are each given as the following Eqs.:

$$E_1=m_oc^2-E_B/2+cp_L/2 \quad (4)$$

$$E_2=m_oc^2-E_B/2-cp_L/2 \quad (5)$$

wherein $p_L$ is the momentum component of the positron-electron pair in the γ ray emission direction. $cp_L/2$ is the Doppler broadening component. From Eqs. 4 and 5, the energy difference of the two γ rays can be represented as follows.

$$E_1-E_2=cp_L \quad (6)$$

Figure 10:
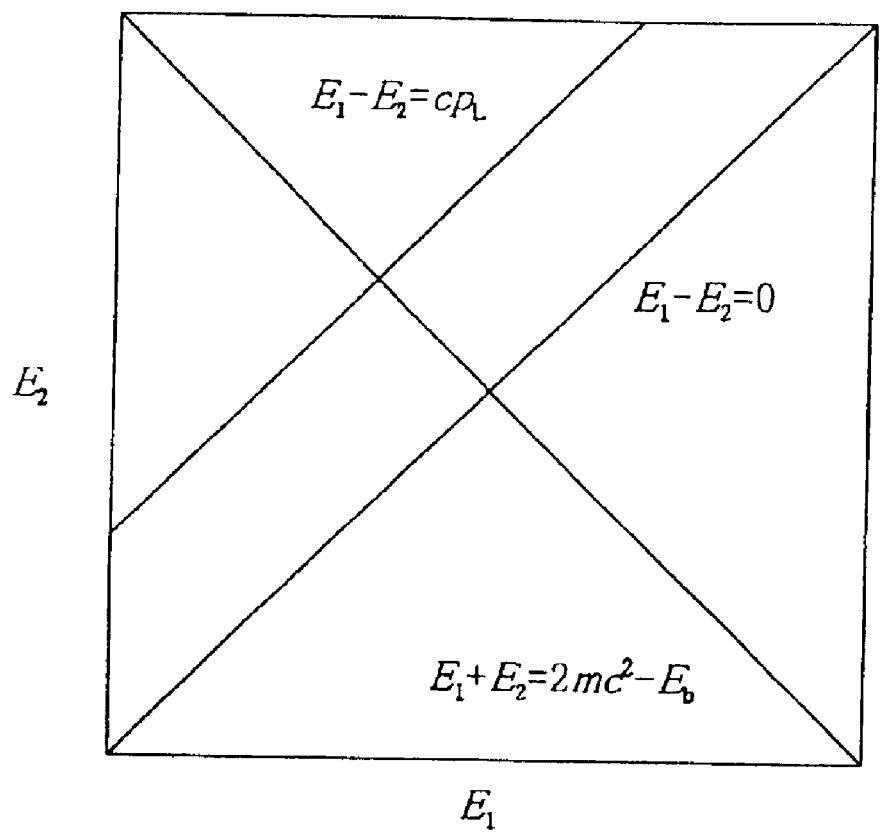
FIG. 10 is a graph used in determining the momentum component $p_L$ of positron-electron pairs along the γ ray emission direction, by means of the coincidence Doppler broadening method.

It will be understood that $p_L$ can be determined from Eq. 6 by measuring $E_1-E_2$. This corresponds to solve the simultaneous equations of Eqs. 3 and 6. As shown in the drawing, the energy distribution of the two measured γ rays are graphed with $E_1$ as the longitudinal axis and $E_2$ as the horizontal axis, and the points where the two lines intersect each other are determined. This procedure is shown in FIG. 10.

Figure 11:
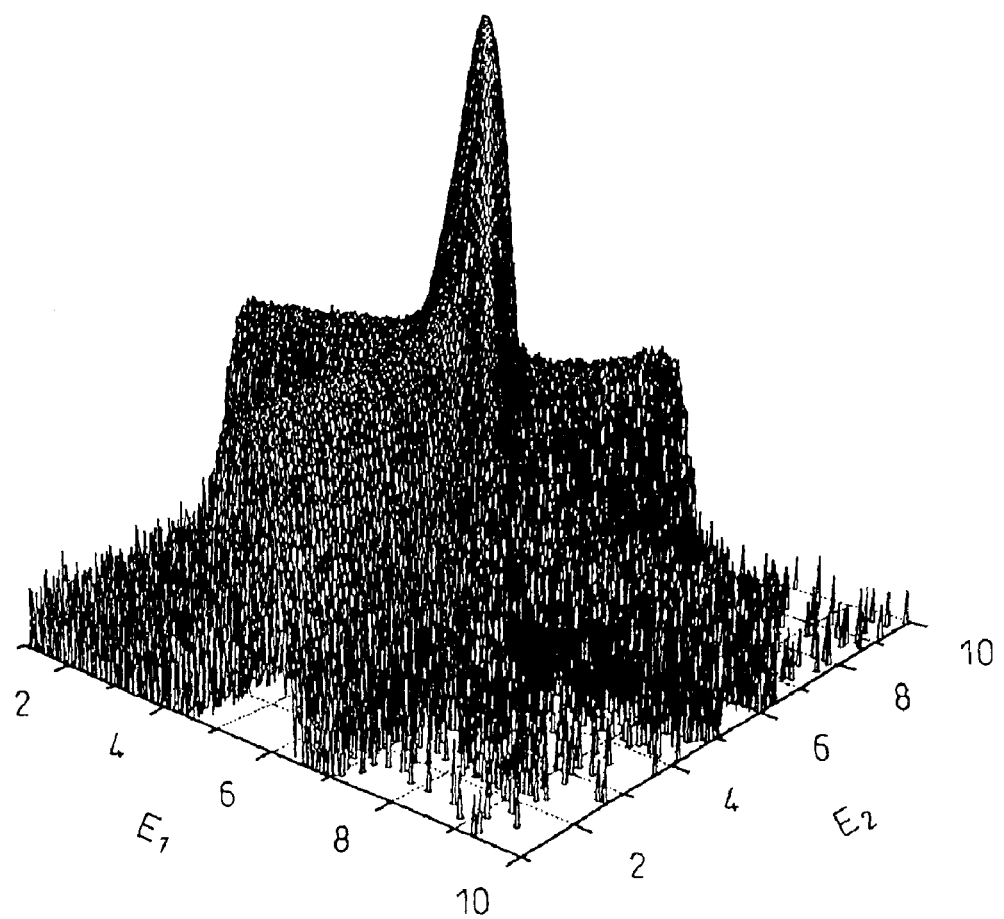
FIG. 11 shows a bird's eye view of a spectrum actually obtained using the coincidence Doppler broadening method; the longitudinal axis of the spectrum is the logarithm of the γ ray counts.

FIG. 11 shows a bird's eye view of a coincidence Doppler broadening actually measured. In the actual experiment, in order to increase statistical precision, values that satisfy the condition $2m_oc^2-\Delta E_w<E_1+E_2<2_oc^2+\Delta E_w$ ($\Delta E_w$ is 1 to 2 keV) are integrated in the direction perpendicular to the straight line indicated by Formula 3.

2. Results of Coincidence Doppler Broadening Measurement Method

Figure 12:
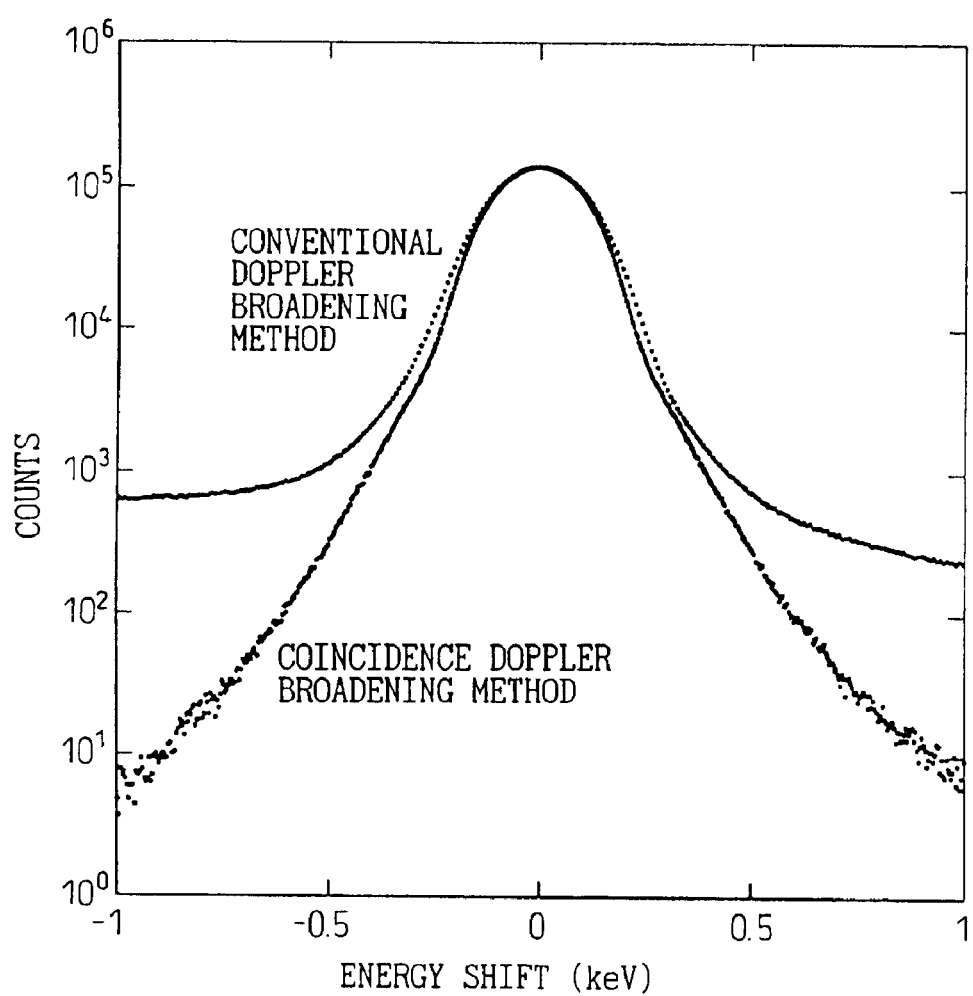
FIG. 12 is a graph showing a spectrum obtained using the coincidence Doppler broadening method and a spectrum obtained using conventional Doppler broadening method.

FIG. 12 shows a graph in which a spectrum obtained by coincidence Doppler broadening measurement and a spectrum obtained by conventional Doppler broadening measurement are overlapped. By using the coincidence Doppler broadening measurement method, the S/N ratio increases by two to three figures over conventional Doppler broadening measurement method. As a result, data for electrons with a large momentum, in other words core electrons, are not buried in noise and more precise discussion on lattice defects in materials, and so forth can be carried out. The sample used in the coincidence Doppler broadening measurement was p-type silicon [a silicon produced by the Czochralski method, containing boron (B) as an impurity, pretreated with diluted hydrofluoric acid (HF)]. Measurement was performed at room temperature, in vacuum (1×10⁻⁶Pa) with a positron implantation energy of 25 keV.

3. Measuring Apparatus and Data Collection

The measuring apparatus comprises two sets of apparatuses used in conventional Doppler broadening method, including γ ray detectors and a circuit for measuring the input timing of each of the γ ray detectors and inspecting simultaneity of γ ray emissions.

Figure 13:
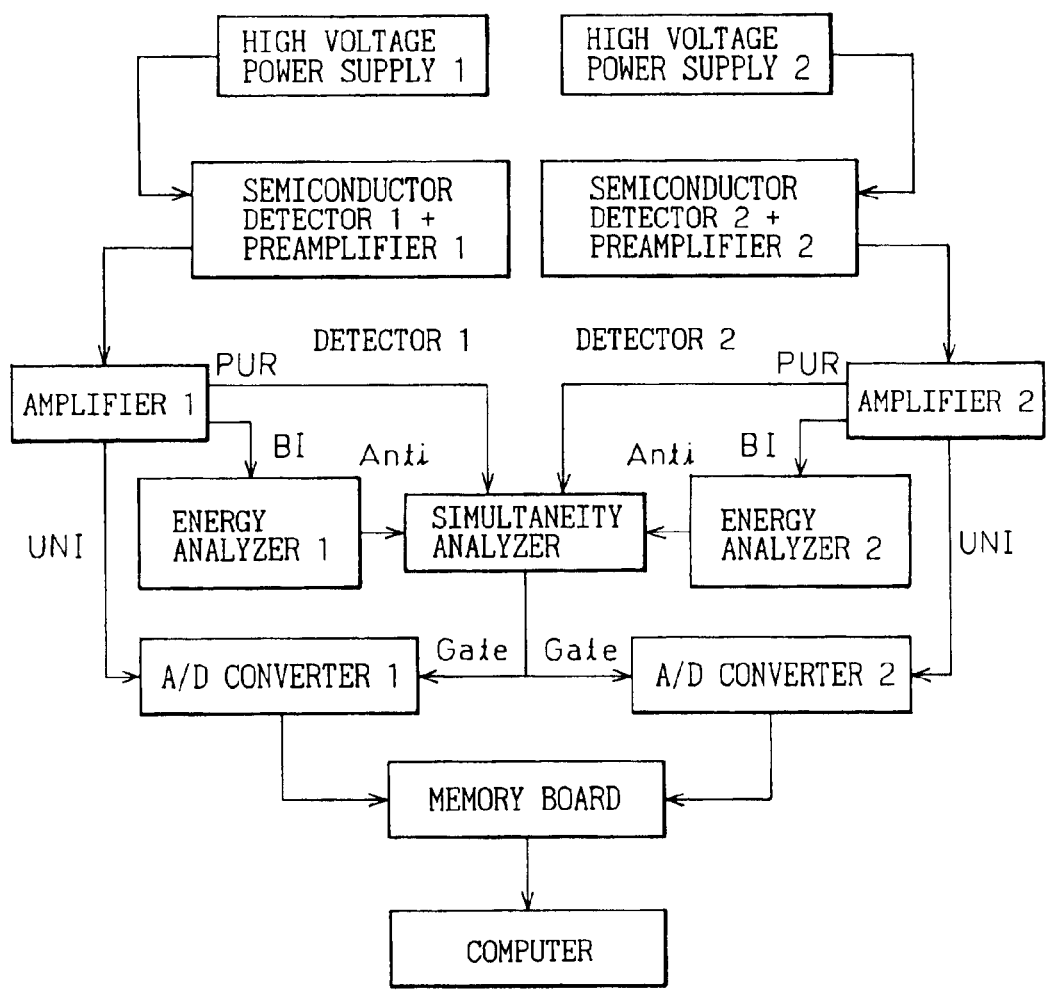
FIG. 13 is a block diagram of the coincidence Doppler broadening method.

FIG. 13 shows a block diagram of the measuring apparatus. High voltage power supply 1 and 2 are high voltage sources for applying a high voltage to each of the semiconductor detectors. The outputs of the preamplifiers of the semiconductor detectors 1 and 2 are input and amplified in each of the amplifiers 1 and 2. The unipolar outputs (UNI) of the amplifiers 1 and 2 are respectively input to the analog/digital converters (A/D converters) 1 and 2 and A/D converted. In order to inspect simultaneity, the bipolar outputs (BI) of the amplifiers 1 and 2 are used. Here, a delay circuit is provided at the unipolar outputs of the amplifiers 1 and 2, and allows controlling the timing between digital pulses created by the bipolar output and unipolar output. Energy analyzers 1 and 2 each perform energy analysis using the bipolar outputs. These energy analyzers are set to output a gate signal (Gate) only when γ rays corresponding to approximately 511 keV are input. The outputs from the two energy analyzers are input to simultaneity analyzers to check simultaneity. At this time, pile-up rejecter signals (PUR) supplied by the amplifiers 1 and 2 are input to anti-coincidence circuits in the simultaneity analyzer, whereby piled up signals are eliminated. Consequently, the simultaneity analyzer outputs only when four signals are simultaneous. These outputs are used as the gate signals to the A/D converters 1 and 2. Data collection can be performed on a Windows™ based computer. A data collection board is connected to the A/D converters 1 and 2, and pulse height analysis is performed on signals input to the A/D converters 1 and 2. The data collection board uses FAST ComTec high speed data collection system.

While the invention has been described by reference to specific embodiments chosen for the purpose of illustration, it should be apparent that numerous modifications could be made thereto by those skilled in the art without departing from the basic concept and the scope of the invention.

What is claimed is:

1. A defect evaluation apparatus, comprising:
   a source section having a source for generating positrons;
   a moderator for decelerating the positrons;
   a sample holding section for holding a sample to be measured;
   a transfer section for transferring the positrons from the source section to the sample holding section; and
   a detection means for detecting γ rays emitted from the sample being measured;
   characterized in that said apparatus further comprises:
      a heating means for heating the moderator in a position where there is a possibility of the source being thermally damaged if there is no protection means mentioned below in the source section; and
      a protection means for protecting the source from the heating means and heated moderator when the moderator is being heated using the heating means.

2. The defect evaluation apparatus according to claim 1, wherein the protection means is disposed outside of the space between the moderator and the source when the positrons decelerated via the moderator are injected into the sample, and the protection means is disposed in the space between the moderator and the source when the moderator is heated by the heating means.

3. The defect evaluation apparatus according to claim 1, wherein the heating means faces the moderator when the moderator is heated by the heating means.

4. The defect evaluation apparatus according to claim 1, wherein:
   the moderator is held by a moderator holding means;
   the moderator holding means and the protection means are integrally formed;
   the moderator faces the source when the positrons decelerated via the moderator are injected into the sample; and
   the moderator faces the heating means and the protection means faces the source when the moderator is heated by the heating means, whereby the source is protected from thermal attack from both the heating means and the moderator.

5. The defect evaluation apparatus according to claim 4, wherein:
   the moderator is held by a moderator holding means;
   the moderator holding means and the protection means are integrally formed in an L-shape body;
   the L-shaped body is rotatable so that the moderator or the protection means can be made to face the source; and
   the moderator faces the heating means and the protection means faces the source when the moderator is heated by the heating means, whereby the source is protected from photon irradiation from both the heating means and the moderator.

6. The defect evaluation apparatus according to claim 1, wherein the moderator is rotatable around an axis perpendicular to a path of the positrons from the source to the moderator when positrons are injected into the sample so that the moderator can face the heating means.

7. The defect evaluation apparatus according to claim 4, further comprising a movable means,
   for moving the source away from the moderator so that the moderator is rotatable when the moderator is to be rotated for heating the moderator by the heating means and then making the heating means face the moderator, and
   for moving the heating means away from the moderator so that the moderator is rotatable when the moderator is to be rotated for injecting the positrons decelerated via the moderator into the sample and then making the moderator face the source after the moderator is heated by the heating means.

8. The defect evaluation apparatus according to claim 1, wherein the moderator is formed from a material selected from tungsten, nickel, and iridium.

9. The defect evaluation apparatus according to claim 1, wherein the moderator is selected from a thin film moderator, a parallel ribbon type moderator, and a combination of a thin film moderator and a parallel ribbon type moderator.

10. The defect evaluation apparatus according to claim 9, wherein the moderator is a combination of a thin film moderator and a parallel ribbon type moderator, and D/W= 0.3 to 1.2 wherein D is the gap between adjacent ribbons of the parallel ribbon type moderator and W is the width of the parallel ribbon type moderator.

11. The defect evaluation apparatus according to claim 1, wherein the moderator is heated at a temperature in a range from 2000 to 2500° C. when the moderator is heated by the heating means.

12. The defect evaluation apparatus according to claim 1, wherein the heating means is an electron beam generator.

13. The defect evaluation apparatus according to claim 12, wherein the electron beam generator emits an electron beam such that the moderator is selectively irradiated by the electron beam.

14. The defect evaluation apparatus according to claim 1, wherein the detection means is comprised of two γ ray detectors for detecting γ rays generated by annihilation of positrons;
   said two γ ray detectors are arranged facing each other across the sample; and
   said two γ ray detectors are connected to a circuit for measuring the detection timing for each γ ray detected by said two γ ray detectors and for checking whether two γ rays simultaneously detected by said two γ ray detectors are two γ rays simultaneously emitted in opposite directions by the annihilation of one positron incident on the sample, whereby the energy spectrums of γ rays simultaneously emitted in opposite directions by the annihilation of one positron incident on the sample and detected by said two γ ray detectors are measured.

15. The defect evaluation apparatus according to claim 1, wherein the transfer section comprises a curve section for achieving energy discrimination by means of a magnetic field, and a linear section for reducing a background.

16. The defect evaluation apparatus according to claim 1, wherein the transfer section comprises a curve section for achieving energy discrimination by means of a magnetic field.

* * * * *